(12) United States Patent
Chiang

(10) Patent No.: US 10,648,752 B1
(45) Date of Patent: May 12, 2020

(54) WINTERIZING BYPASS VALVE SYSTEM

(71) Applicant: River Rock Inc., Santa Fe Springs, CA (US)

(72) Inventor: Michael Chiang, Rowland Heights, CA (US)

(*) Notice: Subject to any disclaimer, the term of this patent is extended or adjusted under 35 U.S.C. 154(b) by 0 days.

(21) Appl. No.: 16/354,841

(22) Filed: Mar. 15, 2019

Related U.S. Application Data

(60) Provisional application No. 62/649,101, filed on Mar. 28, 2018.

(51) Int. Cl.
| | | |
|---|---|---|
| *F16K 11/00* | (2006.01) | |
| *F28F 27/02* | (2006.01) | |
| *F28F 9/02* | (2006.01) | |
| *F16K 31/52* | (2006.01) | |
| *F16K 31/60* | (2006.01) | |
| *F16K 11/085* | (2006.01) | |

(52) U.S. Cl.
CPC ............ *F28F 27/02* (2013.01); *F16K 11/085* (2013.01); *F16K 31/522* (2013.01); *F16K 31/602* (2013.01); *F28F 9/0246* (2013.01); *F28F 2250/06* (2013.01)

(58) Field of Classification Search
CPC .............................. F28F 27/02; F28F 2250/06
USPC ........................................ 137/599.11, 599.14
See application file for complete search history.

(56) References Cited

U.S. PATENT DOCUMENTS

| | | | | |
|---|---|---|---|---|
| 3,034,532 A | * | 5/1962 | Sullivan | F16K 11/168 137/627.5 |
| 3,128,792 A | | 4/1964 | Clinton | |
| 3,187,570 A | * | 6/1965 | Mueller | G01F 15/185 73/201 |
| 3,840,175 A | * | 10/1974 | Jacuzzi | F01P 7/16 236/20 R |
| 4,286,617 A | * | 9/1981 | Bedient | B60R 15/00 137/334 |
| 5,421,813 A | * | 6/1995 | Ohnishi | A61M 1/3643 137/599.14 |
| 6,445,880 B1 | | 9/2002 | Hollander et al. | |
| 6,622,930 B2 | | 9/2003 | Laing et al. | |
| 7,020,386 B2 | * | 3/2006 | Scime | F24F 1/00 392/441 |
| 7,089,955 B1 | | 8/2006 | Komro, Sr. | |
| 7,621,295 B2 | | 11/2009 | Reck | |
| 7,631,662 B2 | | 12/2009 | Reck | |
| 7,644,730 B2 | | 1/2010 | Reck | |
| 7,681,596 B2 | | 3/2010 | Reck | |
| 7,762,280 B2 | * | 7/2010 | Pettinaroli | F16K 11/0873 122/13.3 |
| 7,789,106 B2 | | 9/2010 | Reck | |
| 7,857,002 B2 | | 12/2010 | Reck | |

(Continued)

*Primary Examiner* — Reinaldo Sanchez-Medina
(74) *Attorney, Agent, or Firm* — The Law Office of Austin Bonderer, PC; Austin Bonderer

(57) ABSTRACT

A bypass system for a water heat exchanger is disclosed. The water heat exchanger has a water heat exchanger inlet attached to a feed valve and a water heat exchanger outlet attached to an exit valve. The feed valve and the exit valve are three-way bypass valves attached to a bypass line. When the feed valve and the exit valve are in the flow through position, fluid will flow into and out of the water heat exchanger. When the feed valve and the exit valve are in the bypass position, fluid will not enter nor exit the water heat exchanger, but fluid will flow through the bypass line.

4 Claims, 3 Drawing Sheets

(56) References Cited

U.S. PATENT DOCUMENTS

| | | | |
|---|---|---|---|
| 7,954,506 B2 * | 6/2011 | Swan | E03B 7/12 |
| | | | 137/334 |
| 7,971,603 B2 | 7/2011 | Willis et al. | |
| 8,944,086 B2 | 3/2015 | Park | |
| 9,353,998 B2 | 5/2016 | Willis et al. | |
| 9,683,428 B2 | 6/2017 | Peitz | |
| 9,683,677 B2 | 6/2017 | Pettinaroli et al. | |
| 2015/0075638 A1 | 3/2015 | Park | |
| 2016/0040402 A1 | 2/2016 | Ugarte | |

* cited by examiner

WINTERIZING BYPASS VALVE SYSTEM

FIELD

The subject matter herein generally relates to winterization systems for vehicles, including recreational vehicles and boats, that possess water heat exchangers.

BACKGROUND

In areas where one would need to winterize a water system having a water heat exchanger, there is a need to prevent the winterizing fluid from entering the water heat exchanger. Once the water heat exchanger is drained, the risk of harm due to freezing is minimized. However, the lines that carry water or other fluids should be filled with a fluid that prevents freezing. Thus, there is a need for a bypass system.

In vehicles that move, there is a need for a better system, as almost all systems currently in use employ custom bypasses that are typically custom for each application. During construction, of say for example a recreational vehicle (RV), a system of numerous hoses and valves is built on site on an individual basis. During the construction of RVs, this is done in the assembly area.

It must be understood that in the assembly area, there is a lot of particulate from all of the cutting and other construction activities. Debris in any of the lines, valves or clamps can cause failure of the seal in any of the valves. If a valve is compromised, the entire fabrication of the by-pass system must be redone. For each line, valve and clamp that is used, the changes of failure increase by a factor.

Additionally, the bypass system of the prior art, due to its complicated nature and individual builds, requires increased manpower to construct.

Given that valve failure is the primary reason the bypass system has to be replaced, the number of valves in the bypass system of the prior art makes it very difficult to identify the location of the failure. Additionally, the number of valves increases the chances of failure. Also replacement in the field is made more complicated by the fabrication of the bypass of the prior art.

The current invention uses two bypass/three-way valves. The prior art on at least three separate occasions teaches that only one three-way valve and one check valve can be used. In U.S. Pat. No. 7,954,506 to Swan states a "check valve 51 is installed between the water heat exchanger out water outlet 53 and the bypass valve 38 to prevent backflow into the water heat exchanger discharge from the bypass valve." (Col 2., lines—32-35) U.S. Pat. No. 4,286,617 states that "in the normal water supply state, when hot water is in the hot water heat exchanger, it causes a slightly higher pressure thus making valve 20' seal leak slightly because of the back pressure from hot water heat exchanger. This is the reason for the check valve 46." U.S. Pat. No. 7,762,280 states that the "internal bypass port 208 . . . is not preferred when elastomeric seals are used since the seal will not be maintained uniformly compressed when the valve is in the bypass position which could result in premature failure or increased friction. (Col. 4, line 60-Col. 5, line 4) It is clear that the art uses check valves between the water heat exchanger and the three-way valve or does not use a three-way valve at all.

BRIEF DESCRIPTION OF THE DRAWINGS

Implementations of the present technology will now be described, by way of example only, with reference to the attached figures, wherein.

DETAILED DESCRIPTION

Figure 1:
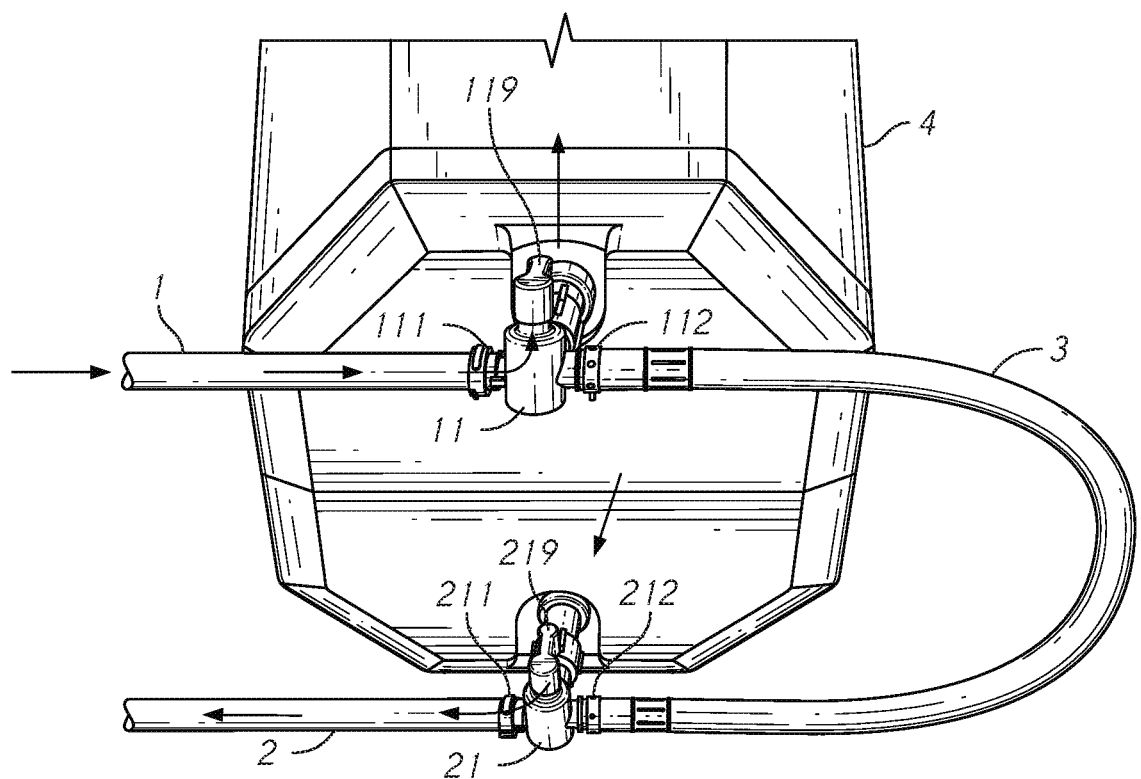
FIG. 1 is a by-pass system according to the prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to water flow systems for vehicles, including boats, which include devices that are sensitive to winterizing fluids.

FIG. 1 illustrates an embodiment of the system in a normal operating condition.

The feed line 1 feeds fluid to the feed valve 11 and fluid enters the water heat exchanger 4, e.g., a water heater. The water heat exchanger 4 comprises a water heat exchanger inlet and outlet. Fluid then exits the water heat exchanger 4 through the exit valve 21 and out the exit line 2.

Figure 2:
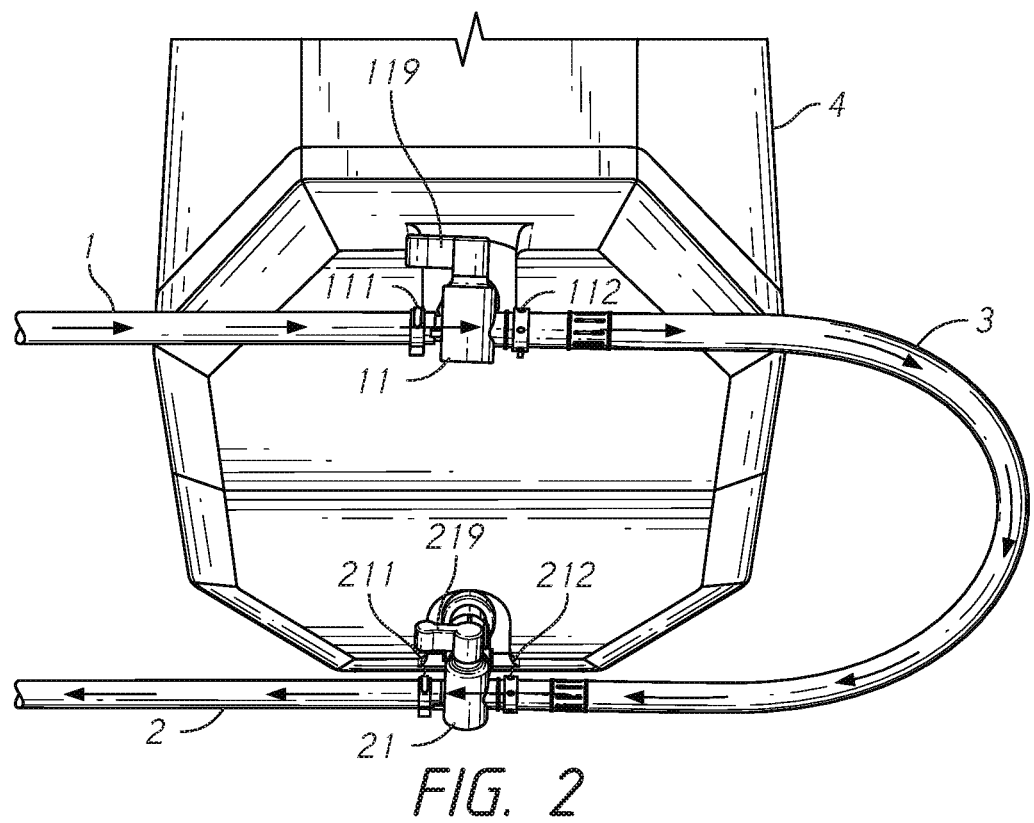
FIG. 2 is an embodiment of two valve bypass system in the normal working condition.
Figure 3:
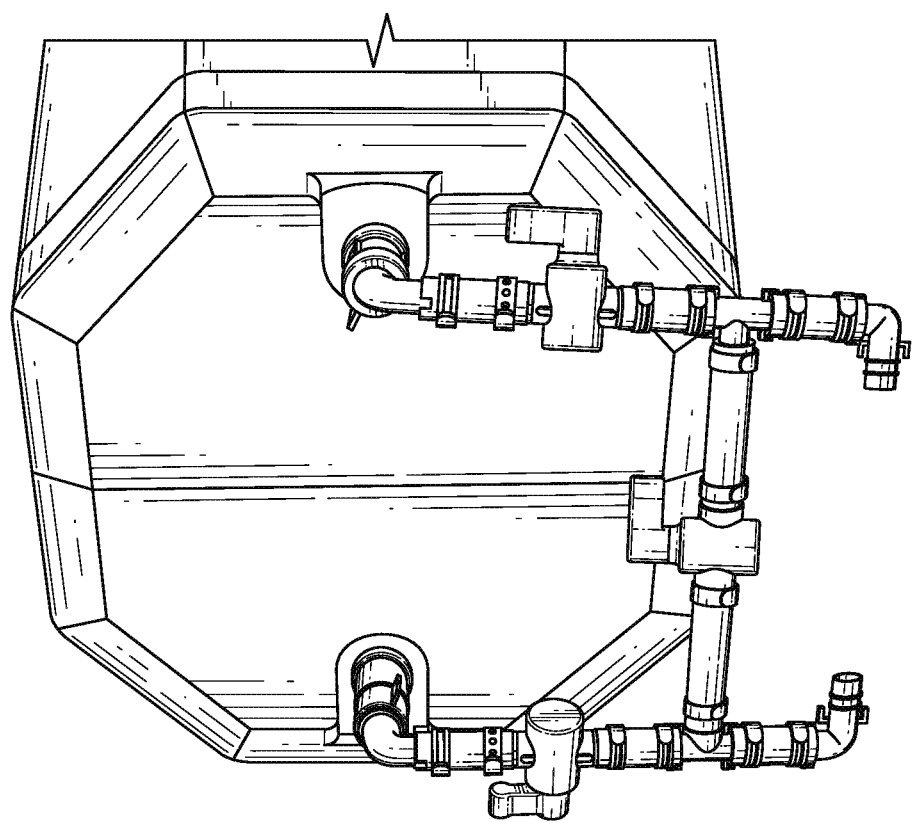
FIG. 3 is an embodiment of the two valve bypass system in the bypass condition.

FIG. 2 illustrates an embodiment of the system in a bypass condition. The feed valve 11 and the exit valve 21 are actuated to direct fluid into the bypass line 3 and prevent entry into the water heat exchanger 4.

In some embodiments, the feed valve 11 and the exit valve 21 are three-way valves comprising a T-port actuating member 32. The feed valve 11 comprises a feed valve inlet 111, a feed valve outlet 112, and a feed valve actuator 119. The exit valve 21 comprises an exit valve inlet 211, an exit valve outlet 212, and an exit valve actuator 219. The feed valve actuator 119 and the exit valve actuator 219 actuate the respective valves to either allow fluid flow to and from the water heat exchanger 4. In the operating condition, the feed valve 11 directs fluid into the water heat exchanger 4 and prevents flow from the feed line 1 into the bypass line 3. The fluid in its return from the water heat exchanger 4 flows into the exit valve 21 which directs fluid out the exit line and prevents backflow into the bypass line 3. When the system is in the bypass condition as seen in FIG. 2, the feed valve 11 directs fluid from the feed line 1 into the bypass line 3 and prevents flow into the water heat exchanger 4. The exit valve 21 directs flow from the bypass line 3 into the exit line 2 while preventing backflow into the water heat exchanger 4.

The feed valve 11 and the exit valve 21 can be moved between a flow-through position and a bypass position. In the flow-through position, generally the working condition of the system, fluid will flow into an out of the water heat exchanger 4. In the bypass position, fluid will bypass the water heat exchanger and flow into the bypass line 3.

Figure 4:
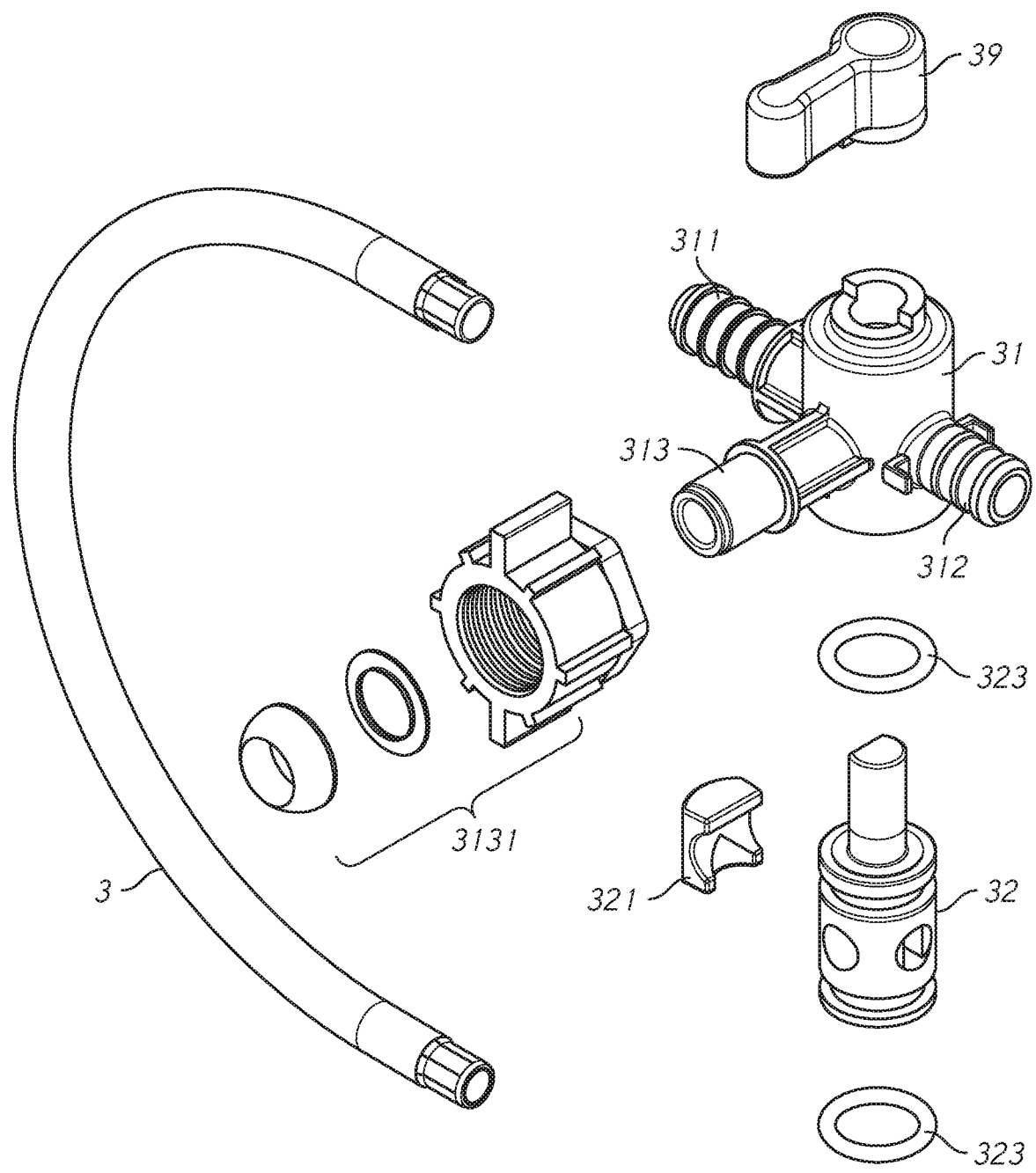
FIG. 4 is an embodiment of the bypass valve.

FIG. 4 illustrates an embodiment of a bypass valve 10. In the embodiment shown, the three-way valve comprises a housing 31 and a T-port actuating member 32. In some embodiments, the T-port actuating member is a barrel. In some embodiments, the T-port actuating member is a ball. The T-port actuating member defines an internal passageway with three openings in communication with each other via the internal passageway. The housing 31 comprises a first port 311, a second port 312 and a third port 313. In some embodiments, the first port 311 and the second port 312 comprise barbed fittings, and the third port 313 comprises valve compression fitting 3131. The valve compression fitting 3131 is selected to correspond to the fitting of the water heat exchanger 4. The T-port actuating member 32 comprises a stopper 321. The stopper 321 can be made of an elastic material (e.g., elastomers, rubber) that allows for sealing. The outside of the stopper 321 can be flush with the T-port actuating member 32 so that it has a liquid-tight seal with the inside of the housing 31. O-rings 323 can also be present about the T-port actuating member 32 can be made of an elastic material (e.g., elastomers, rubber) that allows for sealing like the stopper 321. The T-port actuating member 32 is coupled to an actuator 39.

The bypass valve 10 can be attached directly to the water heat exchanger 4 and can be coupled to the bypass line 3 and the feed line 1/exit line 2. Both the feed valve 11 and the exit valve 21 can be a bypass valve 10. Both will attach directly to the water heat exchanger 4 with the valve compression fitting 3131.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
a water heat exchanger comprising a water heat exchanger inlet and a water heat exchanger outlet;
a feed valve coupled to a feed line and directly attached to the water heat exchanger inlet;
an exit valve coupled to an exit line and directly attached to the water heat exchanger outlet;
a bypass line coupled to the feed valve and the exit valve;
wherein the feed valve and the exit valve both comprise:
a bypass valve, configured to move between a flow-through position and a bypass position, comprising:
a housing comprising a first port, a second port, and a third port; wherein the second port is in direct communication with the water heat exchanger;
a T-port actuating member located within the housing, wherein the T-port actuating member defines an internal passageway with three openings that selectively align or not align with the first port, the second port, and the third port; and
an actuator coupled to the T-port actuating member;
in the flow-through position, the bypass valve is configured to allow for fluid communication between the first port and the second port;
in the bypass position, the bypass valve is configured to allow for fluid communication between the first port and the third port and through the bypass line.

2. The apparatus of claim 1, wherein the bypass valve further comprises an o-ring located about the T-port actuating member and is made of an elastomer.

3. The apparatus of claim 1, wherein the bypass valve further comprises a stopper located within the T-port actuating member and is flush with the inside of the housing, and the stopper is made of an elastomer.

4. The apparatus of claim 1, wherein the bypass valve further comprises a stopper located within the T-port actuating member and is flush with the inside of the housing, and the bypass valve further comprises an o-ring located about the T-port actuating member, and the stopper and the o-ring are made of an elastomer.

* * * * *